Oct. 25, 1938.  C. G. MAIER  2,133,998
PROCESS FOR TREATING CHROMITE ORES
Filed June 15, 1937   2 Sheets-Sheet 1
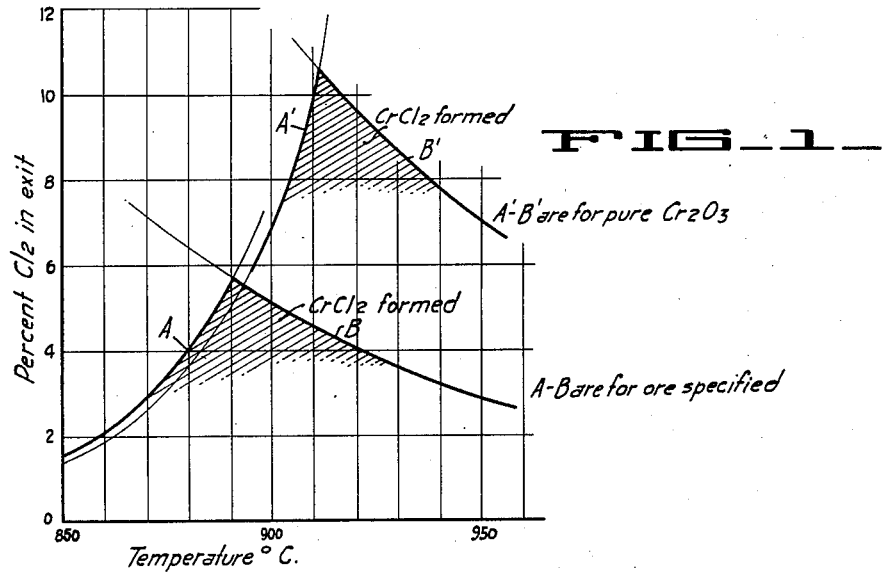
FIG_1_
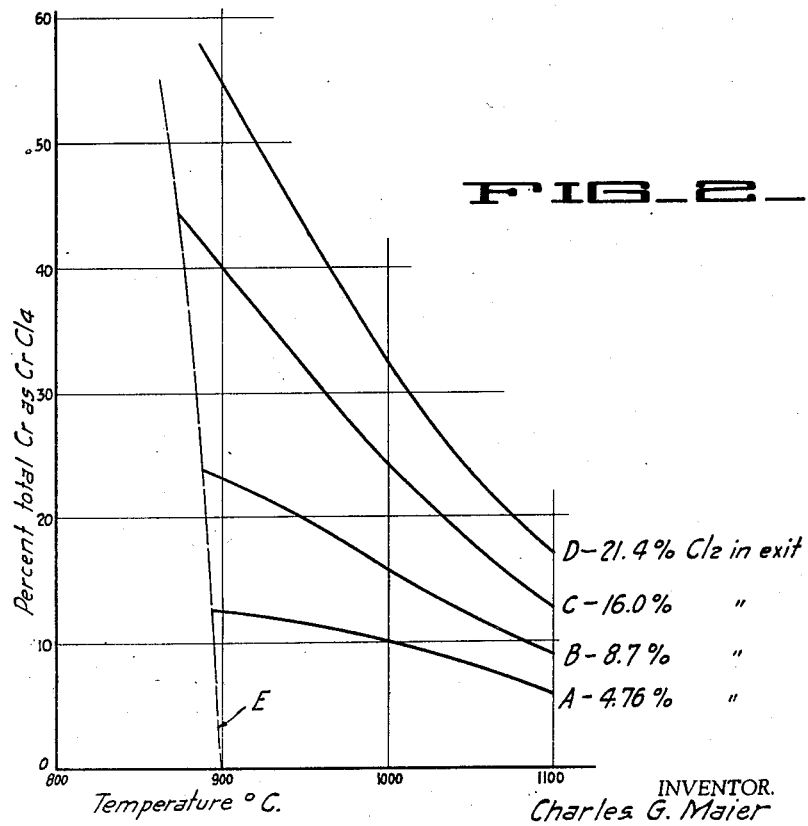
FIG_2_
INVENTOR.
Charles G. Maier
BY Robert H. Eckhoff
ATTORNEY.

Oct. 25, 1938.  C. G. MAIER  2,133,998
PROCESS FOR TREATING CHROMITE ORES
Filed June 15, 1937  2 Sheets-Sheet 2
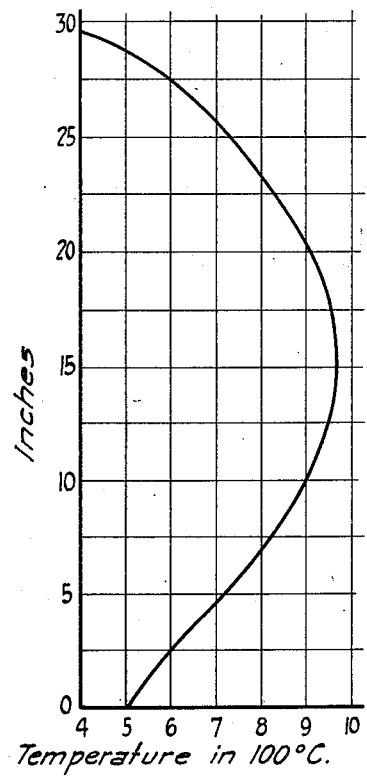
FIG_4_
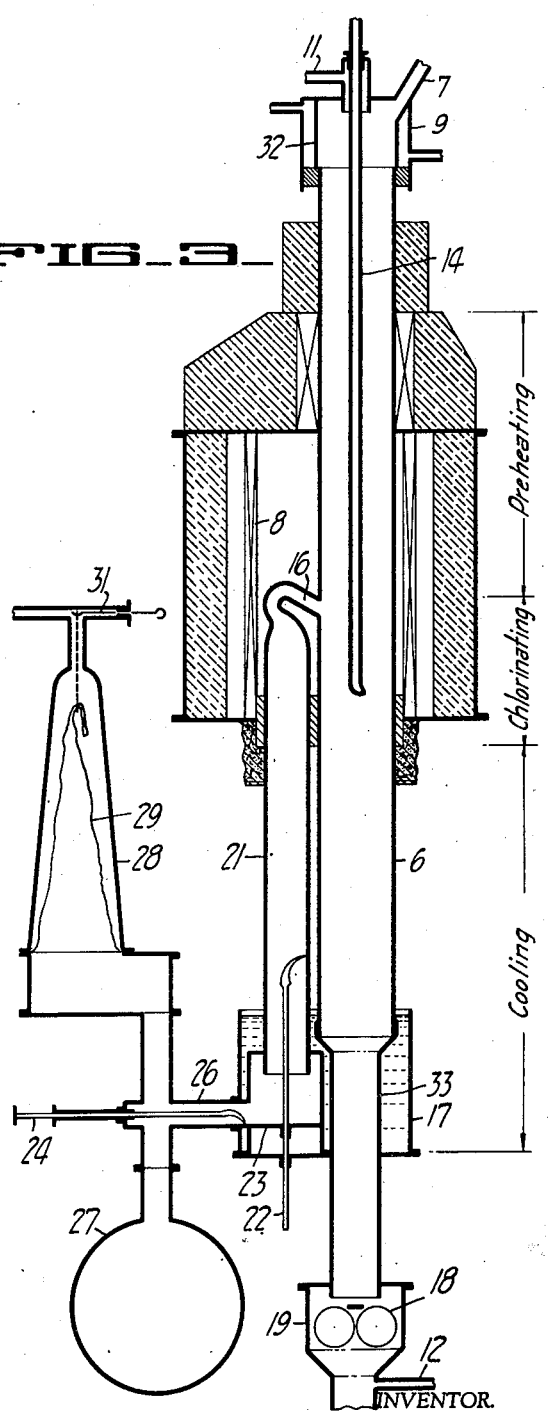
FIG_3_
INVENTOR.
Charles G. Maier
BY Robert H. Eckhoff
ATTORNEY.

Patented Oct. 25, 1938

2,133,998

UNITED STATES PATENT OFFICE 2,133,998

PROCESS FOR TREATING CHROMITE ORES

Charles G. Maier, Oakland, Calif., assignor to Great Western Electro-Chemical Company, a corporation of California Application June 15, 1937, Serial No. 148,322

16 Claims. (Cl. 75—112)

This invention enables chromite ores, especially those of grade lower than at present acceptable for the production of ferro alloys, to be successfully chlorinated in a continuously operated retort, with sublimation of virtually all of the elements forming volatile chlorides, including particularly chromium.

I have attempted to apply methods known to the art, and disclosed by patents, such as for example in the patents of d'Adrian, (see U. S. Patent No. 1,434,385 of Nov. 7, 1922), to a continuously operated vertical retort. I found that the volatile chlorides could not successfully be formed and volatilized by observing the conditions specified and known to previous workers, either in these patents, or others covering the well known interaction of chlorine with oxidic ores and reducing agents. After a thorough investigation of the conditions of volatility of the chlorides of chromium, I discovered how to attain the desired objective of subliming the volatile constituents during chlorination, in a continuously operated countercurrent retort.

In order to accomplish the continuous chlorination and volatilization of chrome ores, I have found it desirable to control the chemical conditions defined by a series of intricate chemical interrelationships between the several chlorides of chromium, and at the same time to control the physical conditions under which the chlorination proceeds. I disclose these chemical conditions in this application, and the equally important and interrelated physical conditions are made the basis of a copending application.

In the early attempts made to utilize the conditions of d'Adrian in a continuous retort furnace, a chromite ore of a type common to domestic deposits was utilized, having the following analysis:

| | Percent |
|---|---|
| $Cr_2O_3$ | 51.6 |
| FeO | 19.6 |
| $SiO_2$ | 5.5 |
| $Al_2O_3$ | 11.8 |
| MgO | 11.5 |
| CaO | 0.8 |
| | 100.8 |

The fact that the total of the analyses is 100.8 rather than 100% is due to unavoidable errors in the analysis of the various constituents, but has no practical significance for the present purposes.

This ore, ground to pass a hundred mesh screen, was intimately mixed with 12.25% of its weight in fine carbon (carbon black) and a small quantity of tarry matter to serve as binder, and was pressed into pellets. An attempt was made to pass these pellets continuously through a vertical retort heated upwards to 1100° C., and there contacted with chlorine at a variety of temperatures. No continuous operation of the retort was possible. Incipient reaction began near 600° C., and some ferric chloride was distilled. Near 800° C. the reaction was vigorous, the gas issuing from the retort was mostly $CO_2$, some iron chloride and a little chromic chloride were produced, but in a very short time after admitting the chlorine stream, it became impossible to keep the charge in motion, and the back pressure on the chlorine feed line became excessive. On opening the retort, the entire column was found to be choked with a closely knit mass of chromic chloride crystals. It was apparent that the temperature was insufficient to volatilize chromic chloride. The retort was again set up, and the temperature raised to 900–1000° C. A very vigorous primary reaction occurred, but the column was choked in even a shorter time than before. Upon opening the retort it was found to be completely plugged with chromous chloride. Virtually no chromic chloride had been distilled. It was apparent that simply raising the temperature to increase the volatility of the chromium chloride, did not solve the difficulty.

An intensive laboratory investigation of the conditions of volatility of the chromium chlorides revealed the following facts:

1. Chromous chloride ($CrCl_2$) was found to have a melting point of 815° C., at which temperature the vapor pressure is 0.0007 atmosphere. The vapor pressures at 900, 1000, and 1100° C. are .004, .024, and 0.103 atmospheres, and the normal boiling point 1302° C. At temperatures where chlorine begins to react readily with mixtures of carbon and chromite, a small but definite vapor pressure exists.

2. It was found impossible to determine directly the vapor pressure of chromic chloride ($CrCl_3$), since this material has an appreciable dissociation pressure as low as 700° C., with chromous chloride and chlorine as primary products. By indirect methods, it was possible to determine the "thermodynamic" vapor pressures of chromic chloride, as follows, at 600, 700, 800, and 900° C., .00007, .002, .039, and 0.396 atmosphere, respectively. The normal sublimation temperature is 947° C.

The "thermodynamic vapor pressure" of CrCl₃ was secured by measuring the actual volatility at a given temperature and correcting this for secondary reactions which cannot be prevented at these temperatures and which are discussed in sections 3 and 4 hereinafter.

3. The volatility of chromic chloride in a chlorine atmosphere was found to be much greater than in an inert atmosphere such as nitrogen. This was proved to be due to the formation of a new chloride of chromium, not previously described in technical literature, namely chromium tetrachloride (CrCl₄). This material exists only as a gas at high temperatures, and upon cooling reverts to chromium trichloride and chlorine. The equilibrium constant for the reaction $$2CrCl_3(s) + Cl_2 = 2CrCl_4(g)$$

was found to be at 600, 700, and 800° C., .00185, 0.02922, and 0.364 respectively. Thus when the total pressure is 1 atmosphere, the partial pressure of chromium tetrachloride in a chlorine atmosphere is .033, 0.157 and 0.448 of an atmosphere respectively. These quantities are slightly less than the normal vapor pressure of chromic chloride in the lower part of the temperature range, but become more than ten times as great at 800°.

4. The partial pressures of chlorine which would prevent the primary dissociation of chromic chloride, in a system containing condensed CrCl₃ were determined as follows, at 700, 800, 900, 1000° C., 0.000002, .00008, .003, and .043 atmosphere, respectively.

Based on these investigations and findings, I have devised a successful continuous chlorination and sublimation process which depends on maintaining the following conditions:

(a) The disposition of the chromite-carbon mixture in a vertical countercurrent retort is maintained in a physical condition, in accordance with my copending application, Serial No. 148,321 of June 15, 1937, permitting a definite and controlled excess of chlorine to be maintained at all times. Briefly, my copending case contemplates, among other things, disposing finely divided ore in a thin bed during the reaction, a bed not exceeding 3 m. m. in thickness. Such a bed is conveniently provided by coating carrier particles of large mass with the fine ore by tumbling or otherwise coating the particles with the ore.

I have found experimentally that a partial pressure of chlorine of substantially 10% is suitable for this purpose. It will be realized that virtually pure chlorine is admitted to the retort, but that the progress of the reaction absorbs chlorine, and produces carbon dioxide according to the well known reactions:

$$2Cr_2O_3 + 3C + 6Cl_2 = 4CrCl_3 + 3CO_2$$

or $$2FeO + C + 3Cl_2 = 2FeCl_3 + CO_2$$

with similar reactions for the alumina and magnesia. The rate at which these reactions occur depends on the physical conditions and temperature of contact, and the flow of chlorine must be so adjusted in accordance with the temperature that an excess of chlorine corresponding to 10% Cl₂ in CO₂ gas remains after reacting and condensing sublimed chlorides. It will be found, because of the high rate of the reaction in the higher temperature ranges near 1000-1050° C., that to achieve this necessary condition in a continuous countercurrent unit it is desirable to practice the disclosure of my copending application.

In this way I completely prevent the harmful dissociation of chromic to chromous chloride at all temperatures suitable for sublimation of the chromium chlorides, preventing stoppage of the flow of gas and of passage of ore because of the accumulation of liquid CrCl₂, and at the same time I enhance the volatility of the chromium chlorides by causing appreciable concentrations of chromium tetrachloride to be supported by the chlorine partial pressure in accordance with the results disclosed in section 3 above.

(b) The vertical continuous retort being provided with means for removing the gases consisting of sublimed chlorides, carbon dioxide, and excess chlorine at an intermediate point of the heated zone, I adjust the rate of downward passage of solids, and the application of either external or internal heat in such a way that the maximum temperature of the column is greatest at a point somewhat below the above mentioned outlet, and so that this exit is never at a temperature lower than 900° C. This temperature is slightly above the temperature at which solid chromic chloride is in equilibrium with a partial pressure of approximately 0.38 atmosphere of chromic chloride gas. The above mentioned dilution of the gas leaving the retort with CO₂ produced by the reaction limits the maximum concentration of chromic chloride vapor to near this value. By maintaining the condition as stated no solid CrCl₃ is stable, and it sublimes as rapidly as formed, whence the stoppage of the column by unvaporized chromium chlorides is prevented, and continuous chlorination and sublimation assured.

Understanding of the above conditions (a) and (b) requires further explanation, which is best disclosed by further reference to the specific conditions applying when ore of the analysis given above is being treated. Under conditions suitable for chlorination and sublimation of the chromium chlorides, all oxidic materials in the ore with the exception of silica are chlorinated. The chlorides of iron, chromium and aluminum are volatilized, and the chlorides of magnesium and calcium remain as liquids with the solids of the charge. Taking a unit charge as 2000 grams, the following stoichiometric conditions hold.

| Constituent | Formula wt. | Percent | Wt. in 2000 gms. | Gms. formula wt. |
|---|---|---|---|---|
| Cr₂O₃ | 152.02 | 51.6 | 1032 | 6.78 |
| FeO | 71.84 | 19.6 | 392 | 5.46 |
| SiO₂ | 60.06 | 5.5 | 110 | 1.82 |
| Al₂O₃ | 101.94 | 11.8 | 236 | 2.32 |
| MgO | 40.32 | 11.5 | 230 | 5.70 |
| CaO | 56.08 | 0.8 | 16 | 0.28 |

The theoretical carbon used, equivalent to CO₂ formed is:—

| For constituent | Amount | Total |
|---|---|---|
| Cr₂O₃ | 1.5×6.78 | 10.17 |
| FeO | 0.5×5.46 | 2.74 |
| Al₂O₃ | 1.5×2.32 | 3.48 |
| MgO | 0.5×5.70 | 2.85 |
| CaO | 0.5×0.28 | 0.14 |
| All | | 19.38 equiv.=232.3 gms. |

Similarly, the mols of Cl₂ required are:—

| For constituent | Amount | Total |
|---|---|---|
| Cr₂O₃ | 3 ×6.78 | 20.34 |
| FeO | 1.5×5.48 | 8.22 |
| Al₂O₃ | 3 ×2.32 | 6.96 |
| MgO | 1 ×5.70 | 5.70 |
| CaO | 1 ×0.28 | 0.28 |
| All | | 41.50 mols Cl₂ or 2941 gms. |

Finally the volatile chlorides are the equivalent of

| Constituent | Gaseous mols |
|---|---|
| 2CrCl₃ | 13.56 |
| ½Fe₂Cl₆ | 2.74 |
| 1Al₂Cl₆ | 2.32 |
| All gaseous chlorides | 18.62 |
| CO₂ from above | 19.38 |
| All gaseous constituents | 38.00 |

It would appear from these figures that if 41.50 mols of chlorine were contacted with 2000 grams ore of the composition specified, mixed with 232 grams carbon, that according to hitherto known art, complete reaction should take place and the chromium sublime whenever the temperature reaches a point where the vapor pressure of this material is greater than $$\frac{13.57}{38.00}$$

or 0.357 atmosphere. Actually, this will not occur, because of side reactions. Thus primarily one obtains $$2CrCl_3 = 2CrCl_2 + Cl_2 \quad (1)$$

followed by $$2CrCl_3 + Cl_2 = 2CrCl_4 \quad (2)$$

Since reaction (2) uses up chlorine, reaction (1) then proceeds further, and the consecutive reactions will continue until a balanced or equilibrium condition is reached. When this is complete a considerable portion of the chromium will be in the form of CrCl₂, which is liquid and relatively non-volatile, whence the retort becomes clogged and inoperative.

The actual chlorine content of the equilibrium mixture totals near 900° C. only a few tenths percent, but it is not sufficient for successful operation to maintain a slight excess of chlorine over this, as a primary addition, since any excess chlorine added at first merely increases the relative amounts of CrCl₄ as compared to CrCl₃, and being used up in forming CrCl₄ does not prevent the formation of CrCl₂. This situation will be understood by reference to Fig. 2, which shows the relative amounts of CrCl₄, expressed as percent of the total amount of volatile chromium chlorides present, when various excess amounts of chlorine are added. Each curve, A, B, C, D, refers to a specified amount of Cl₂ found in the exit gas (CO₂) after reaction, and after reversal of reaction (2) upon cooling and condensation. These curves end in the broken line E, which shows the temperature at which condensation of CrCl₃ begins.

Above and below the temperature at which the normal vapor pressure of CrCl₃ is adequate to cause complete volatility of the chromium chloride when diluted with the amounts of CO₂ produced by the reaction, two different sets of conditions apply to the minimum amount of excess chlorine which will suffice to prevent the formation of CrCl₂. These are illustrated in Fig. 1, which shows in curve A the amount of Cl₂ present in the exit CO₂ when CrCl₂ is just prevented from forming in the presence of solid CrCl₃, and in curve B the amount present when the amount of CrCl₃ formed is insufficient to saturate the gas phase at temperatures above the normal saturation temperature. It will be apparent that these curves intersect at a temperature just below the normal saturation point for a partial pressure of 0.357 atmosphere, and show that the peak is at 5.5% Cl₂ in the exit. Below these curves chromous chloride is formed.

Since in a countercurrent continuous operation chlorine and ore-carbon mixtures must necessarily be in contact at a variety of temperatures at or near the operating temperature, it is clear that an amount of excess chlorine must be used corresponding to at least 5.5%. The amount can most readily be confirmed by analysis of the exit gas after volatile chlorides are condensed, and it has been found inadvisable to approach too closely to the critical point in actual practice. It has been found that between 10% and 11% in the exit CO₂ is a safe working limit, allowing a margin of safety for uncontrolled fluctuations in the operating conditions and variations of ore treated. It is further apparent that the critical point, while largely controlled by the chemical interrelationships of the chlorides of chromium, is also somewhat dependent on the composition of ore treated. The term "chlorine excess of about 10%" employed in some of the claims, means chlorine in excess of that required to chloridize all chloridizable ore constituents to normal chlorides.

Thus, in order to show the conditions under which the largest amounts of excess chlorine would be required, corresponding to the severest operating conditions, the upper curves A' and B' are plotted in Figure 1 to show the limitations when pure Cr₂O₃, rather than chromite ore, is chlorinated. It will be noted that the curves A and A', showing the conditions limiting the formation of CrCl₂ when solid CrCl₃ is present, differ only slightly for the chlorination of ore as compared with the chlorination of pure Cr₂O₃. In this instance the partial pressure of CrCl₃ in the gas is fixed by the vapor pressures of this material, and the change is produced by the slight dilution effect of the volatile chlorides and their equivalent CO₂ acting upon the concentration of other constituents, except CrCl₃.

The curves B and B', for temperatures above the dew points of CrCl₃, differ more appreciably, because in this instance the concentrations are affected by stoichiometric relationships. It is clear, however, that no greater concentrations of CrCl₃ could be obtained under any conditions of chlorinating oxidic chromite ores than corresponding to the concentrations equivalent to the action of Cl₂ upon pure Cr₂O₃, whence the peak at 10.7% may be taken as the upper limit under any conditions of operation, and for any ore. Since this point must be determined indirectly, and may be subject to slight error, the figure 10 to 11%, which coincides with the experimental limit found by actual operation of a continuous chlorination retort, is taken as the practical upper working limit. Thus, while, from the above it would seem that if an ore lean in Cr₂O₃ were treated, the chlorine excess might be reduced, such practice would approach a condition of increasing the operating risk with respect to retort stoppage.

This may be explained as follows: The iron content of the chromite is somewhat more readily chlorinated than the chromium and it is possible to have in a travelling column of ore various relationships between $Cr_2O_3$ and FeO corresponding to the degree to which chlorination has proceeded, and this situation is equivalent of an increase of $Cr_2O_3$ in the ore. Thus, the only absolutely safe working conditions are those corresponding to pure $Cr_2O_3$, since all actual operating conditions must necessarily be less severe than for the pure material, and any enrichment of the ore in $Cr_2O_3$ due to preferential chlorination at some intermediate point in the chlorinating column cannot require conditions more severe than for $Cr_2O_3$ alone.

Referring now to condition (b), it will be apparent from reference to Fig. 1 that the temperature at which condensation occurs is somewhat depressed when excess chlorine is used. It has been found that if the temperature of the gas leaving the retort is maintained no lower than 900–920° C., which will be some 10 to 15 degrees higher than the true condensation point when 10%–11% chlorine is maintained in the residual gas after condensation of chlorides when treating the specified ore, continuous operation is feasible, and a safe margin for operating requirements is provided.

There is obviously no exact critical upper limit of temperature when the proper excess of chlorine is used. While chromic chloride vapor in equilibrium with solid crystals would require approximately .01 atmosphere chlorine to prevent dissociation at the normal sublimation point (947° C.), the dilution of the gas phase with $CO_2$ from the reaction prevents saturation at temperatures above 900–920° C., which results in a continuously lessening requirement for excess $Cl_2$ at temperatures above this point. Nevertheless, reference to the curves of Fig. 2 shows that the amount of $CrCl_4$ decreases with the temperature, and that to ensure the advantages of the volatility of this material it is desirable not to utilize temperatures above 1050 to 1100° C. Such temperatures are also inadvisable because of enhanced reactivity with the silica content of the ores, and with the furnace walls.

Referring to the stoichiometric quantities presented above, it will be clear that 10% $Cl_2$ in the exit $CO_2$ corresponds to 2.15 mols of $Cl_2$ per 19.38 mols $CO_2$, whence the total chlorine requirements are $41.50+2.15=43.65$ mols, or 1.053 times the theoretical. While this gives the theoretical basis for control of chlorine admission, it is advisable to check the required condition periodically by analysis of the exit gas, especially if the composition of ore changes markedly.

It is advisable to maintain the carbon at the exact stoichiometric equivalent of the ore, since this has a somewhat deleterious effect upon the rate of chlorination of the last of the chromic oxide. It has been found advisable to use about 1.25 to 1.35 times the theoretical carbon addition, whereupon extractions of over 99% of the chromium are readily obtained, and the reaction rate holds up well even in the lower stages of the counter-current action.

In Figure 3 I have shown a diagrammatic representation of an apparatus which I have successfully employed. In this apparatus, a vertical shaft 6 is provided. The shaft is made of inert material as silica, and I have successfully used the material known as Vitreosil. At the upper end of the shaft an ore inlet 7 permits the introduction of the charge, preferably in the form of the aforementioned carrier particles coated with the ore-carbon mixture. Heating means, indicated at 8, provided in the form of electrical resistance, is positioned about a portion of the shaft intermediate the ends thereof. The upper portion of the shaft 6 is continued by a metal extension 32. The joint between the shaft and extension is protected by a surrounding water cooling jacket 9. About 10% of the chlorine is introduced through an inlet 11 placed at the top of the shaft, the remainder being introduced through an inlet 12 adjacent the bottom of the equipment. A thermocouple well 14 extends downwardly into the shaft to below outlet 16 which provides the exit for volatilized materials. Exit 16 is placed above the lower end of the heating zone, to insure that the volatilized chlorides are removed. Usually the exit is placed about a quarter of the zone length above the lower end, for this insures good results. At the base of the shaft another cooling section 17 is provided, to protect the joint between shaft 6 and a metal base structure 33 and cool the materials which pass therethrough to be removed by discharge conveyers 18 in case 19 at the bottom of the shaft.

Volatilized products pass over through exit 16 into condenser 21. The condenser is also of silica (usually Vitreosil). Volatilized chlorides are condensed in the condenser and scraper 22 permits volatilized chlorides condensing on the side of the condenser to be scraped out into the bottom of the equipment onto plate 23 from which they can be removed by another scraper 24 which serves to remove the condenser chlorides into passage 26. The material collected in the passage 26 is drawn by scraper 24 into receiver 27. Unvolatilized material, dust fines and the like, pass into vessel 28 wherein the gas is filtered through filter bag 29, usually an asbestos filter. A shaker 31 supports the upper end of the bag and this is shaken occasionally so that the collected dust drops down into the receiver 27.

In Figure 4 I have shown the temperature gradient relative to the heighth of the retort. This shows the actual temperature existing in any portion of the equipment under constant operating conditions.

Having thus disclosed the chemical conditions necessary to maintain continuous counter-current chlorination and sublimation of chromite ores,

I claim:

1. A method of continuously chlorinating chromite ores which consists in maintaining an excess of chlorine sufficient to ensure and to effect substantially complete chloridization of chloridizable constituents in said ore and to promote substantial increase of volatility of chromium chlorides by conversion of lower chlorides to chromium tetrachloride, and maintaining a residue of free chlorine sufficient to prevent the dissociation of said chlorides to the chromous condition while maintaining a temperature at which chromium chlorides sublime freely to effect substantially complete removal of chrome from said chromite ore as the trichloride.

2. In a method of continuously chlorinating chromite ores, the control of operation and the maintenance of continued passage, by adjusting the rate of countercurrent chlorine flow with respect to the rate of passage of ore so that the exit gases, after substantially complete chlorination of all chloridizable material in said ore and condensation of sublimed chlorides including substantially all chromium as chromic chloride, contain no less than 5.5% free chlorine, and are normally maintained at substantially 10% free chlorine.

3. A method of continuously chlorinating chromite ores in which chromite-carbon mixtures are contacted with chlorine in proportion not less than 1.053 times the theoretical stoichiometric amounts required to produce normal chlorides in said chromite ore, and in which the gases produced by reaction and sublimation are removed from the ore column at temperatures not less than 890° C.

4. In a continuous countercurrent chlorination of chromite ores, the process which supplies chlorine in amounts sufficient to produce substantial amounts of chromium tetrachloride, and sufficient excess to maintain not less than 10–11% free chlorine in the products of chlorination after substantially complete chlorination of said ore and condensation of sublimed chlorides including chromium as chromic chloride, to a moving column of chromite ore so disposed in a retort or furnace that the volatile and gaseous products are removed from the ore column at a point on the upstream side of the maximum temperature of an ore column; and at a temperature of not less than 900° C.

5. In the chlorination of a chromite ore, the steps of passing said ore countercurrent to a stream of chlorine while maintaining said ore during said passage at a temperature of between 900° C. and 1100° C. and maintaining a chlorine excess of about 10%.

6. In the chlorination of a chromite ore, the steps of passing said ore countercurrent to a stream of chlorine while maintaining said ore during said passage at a temperature of between 900° C. and 1100° C. and maintaining a chlorine excess of about 10%, said ore being carried as a thin film coating of finely divided ore on carrier particles relatively massive with respect to said finely divided ore.

7. In the chlorination of a chromite ore, the steps of passing said ore, in the presence of about 1.25 the amount of carbon required to reduce oxides in said ore, countercurrent to a stream of chlorine while maintaining said ore during said passage at a temperature of between 900° C. and 1100° C. and maintaining a chlorine excess of about 10%.

8. In the chlorination of a chromite ore, the steps of passing said ore, in the presence of about 1.25 the amount of carbon required to reduce oxides in said ore, countercurrent to a stream of chlorine while maintaining said ore during said passage at a temperature of between 900° C. and 1100° C. and maintaining a chlorine excess of about 10%, said ore being carried as a thin film coating of finely divided ore on carrier particles relatively massive with respect to said finely divided ore.

9. A method of treating a chromite ore comprising maintaining a body of said ore at a temperature of about 900° C. and above and in the presence of chlorine sufficient (1) to convert all chloridizable material in said ore to chlorides except chromium and (2) to convert and maintain substantially all chromium in said ore as chromic chloride and chromium tetrachloride at said temperature.

10. A method of treating a chromite ore comprising maintaining a body of said ore at a temperature of about 900° C. and above and in the presence of chlorine sufficient (1) to convert all chloridizable material in said ore to chlorides except chromium and (2) to convert and maintain substantially all chromium in said ore as chromic chloride and chromium tetrachloride at said temperature and cooling said chromic chloride and said chromium tetrachloride to ensure formation of (1) chromic chloride as the solid phase containing substantially all the chromium in said ore and (2) an exit gas containing about 10% chlorine.

11. A process for continuously chlorinating volatile chlorides from a finely divided chromite ore comprising disposing said ore, mixed with a reducing agent in a substantially uniformly dispersed mass, in a thin porous bed while subjecting the so disposed ore to the action of chlorine, the ore-chlorine ratio being so adjusted that the coincidental requirements for (1) formation of equilibrium concentrations of $CrCl_4$ and (2) prevention of dissociation of $CrCl_3$ are simultaneously maintained in said mass.

12. A process for continuously chlorinating volatile chlorides from a finely divided chromite ore comprising disposing said ore, mixed with a reducing agent in a substantially uniformly dispersed mass, in a thin porous bed while subjecting the so disposed ore to the action of chlorine, the ore-chlorine ratio being so adjusted that at any instant there is present in said mass chlorine in excess of that required (1) to convert all chloridizable materials, except chromium, therein to the highest chloride thereof and (2) to convert the maximum amount of chromium to the tetrachloride at the temperature at which volatile chlorides are removed from said ore bed.

13. A process for chlorinating a finely divided chromite ore containing various metals in combined form e. g. iron, chrome, calcium and magnesium, said process comprising maintaining a mass of said ore mixed with a reducing agent in a free gas permeable condition during said process at a temperature of about 900° C. and in the presence of chlorine substantially uniformly distributed through said mass and more than sufficient to convert substantially all metals in said ore to chlorides in form corresponding for each metal except chromium to the highest valence of the metal and to convert and vaporize substantially all chromium as chromic chloride and chromium tetrachloride, and cooling vaporized chlorides in the presence of an excess of chlorine to ensure continuance of chromic chloride as the solid phase of chromium.

14. In a process of chlorinating a chromite ore in which a column is employed having an outlet for volatilized chlorides from said ore, the steps comprising supplying ore to establish and maintain a substantially vertically falling stream thereof in said column, supplying chlorine to said column and to the ore stream therein while heating said column to establish a chlorination zone therein, and regulating and adjusting the rate of ore supply and of chlorine supply to maintain said zone adjacent to said outlet.

15. In a process of chlorinating a chromite ore in which a column is employed having an outlet for volatilized chlorides from said ore, the steps comprising supplying ore to establish and maintain a substantially vertically falling stream thereof in said column, supplying chlorine to said column and to the ore stream therein while heating said column to establish a chlorination zone therein, and regulating and adjusting the rate of ore supply and of chlorine supply (1) to maintain said zone adjacent to said outlet (2) to simultaneously maintain in said zone the coincidental requirements for (a) formation of equilibrium concentrations of $CrCl_4$ and (b) prevention of dissociation of $CrCl_3$.

16. A process of chlorinating in a column having an outlet a chromite ore containing various metals in combined form e. g. iron, chromium, calcium and magnesium, said process comprising supplying ore particles to said column to fall substantially vertically down said column in a continuous stream as a thin film coating on carrier particles relatively massive with respect to said ore particles and in the presence of about 1.25 times the amount of carbon required to reduce oxides in said ore, heating said column and supplying chlorine thereto to establish a chlorination zone in said column, and regulating and adjusting the rate of ore supply and the rate of chlorine supply (1) to maintain said zone adjacent to said outlet, (2) to convert all chloridizable materials in said ore, except chromium, to the highest chloride thereof and (3) to convert the maximum amount of chromium to the tetrachloride at the temperature at which volatile chlorides pass through said column outlet.

CHARLES G. MAIER.